(12) United States Patent
Lu et al.

(10) Patent No.: US 10,801,289 B2
(45) Date of Patent: Oct. 13, 2020

(54) VERSATILE FLYING LEAD (HFL) TERMHEAD SYSTEM

(71) Applicant: Oceaneering International, Inc., Houston, TX (US)

(72) Inventors: Ronald Lu, Katy, TX (US); Jason Duncan, Houston, TX (US); Sunil Prakash, Houston, TX (US); Christopher Williams, Fulshear, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/280,702

(22) Filed: Feb. 20, 2019

(65) Prior Publication Data

US 2019/0257170 A1    Aug. 22, 2019

Related U.S. Application Data

(60) Provisional application No. 62/632,714, filed on Feb. 20, 2018.

(51) Int. Cl.
*E21B 33/038* (2006.01)
*E21B 43/013* (2006.01)

(52) U.S. Cl.
CPC .......... *E21B 33/038* (2013.01); *E21B 43/013* (2013.01)

(58) Field of Classification Search
CPC ............................ E21B 33/038; E21B 43/013
USPC ....... 166/338, 339, 340, 341, 344, 345, 347, 166/351
See application file for complete search history.

(56) References Cited

FOREIGN PATENT DOCUMENTS

WO   WO-2018127552 A1 *   7/2018   .......... E21B 43/013

* cited by examiner

*Primary Examiner* — James G Sayre
(74) *Attorney, Agent, or Firm* — Maze IP Law, P.C.

(57) ABSTRACT

A versatile flying lead (VHL) termination head system comprises an underwater vehicle interface, an interface plate, a termination frame, and an adjuster, disposed proximate the termination frame's connection end, which is configured to provide a configurable declination angle which sets a hang-off angle of a device connected to the interface plate with respect to the underwater vehicle interface. A subsea termination head may be manufactured and assembled by obtaining a predetermined set of standardized structural building blocks that fit together to form a complete termination frame which is as described herein, using the predetermined set of standardized structural building blocks to construct a subsea termination head from the predetermined set of standardized structural building blocks substantially in parallel and connecting the underwater vehicle interface to the frame at a predetermined angle using the adjuster.

13 Claims, 6 Drawing Sheets

00 degree Configuration     20 Degree Configuration     45 Degree Configuration

VERSATILE FLYING LEAD (HFL) TERMHEAD SYSTEM

CROSS-REFERENCE TO RELATED APPLICATION

This application claims the benefit of priority under 35 U.S.C. § 119(e) from U.S. Provisional Patent Application No. 62/632,714 entitled "Versatile Flying Lead (HFL) Termhead System" filed Oct. 20, 2018.

FIELD OF THE INVENTION

The invention relates to diagnostics, detection, location, and prediction of faults within a bio-electrical-mechanical system that provides a method of telemetry and has expected behavior.

BACKGROUND

Subsea termination frames are typically welded or bolted structures with a fixed declination angle, preventing a custom frame designed for a particular client's requirement. These are also typically not able to be re-configured to rapidly meet various operation requirements.

Further, current manufacturing processes of subsea termination frames occur in a rigid, linear path. A parallel manufacturing process for subsea termination heads can allow the structural termination frame and the internals to be manufactured in parallel, reduce the total manufacturing time/cost for a subsea termination head.

FIGURES

The following figures are illustrative.

DESCRIPTION OF PREFERRED EMBODIMENTS

In its embodiments, versatile flying lead (VHL) termination head system 100 comprises underwater vehicle interface 110 allows adjustability of frame angle which further allows one termination head design to be used for various operation requirements. It also allows for use of standardized machined (non-fabricated) building blocks for a centralized spine of the disclosed termination frame which allows for part simplicity and remote manufacturing.

In various embodiments, parallel manufacturing of versatile flying lead (VHL) termination head system 100 may reduce manufacturing time and cost.

Figure 1:
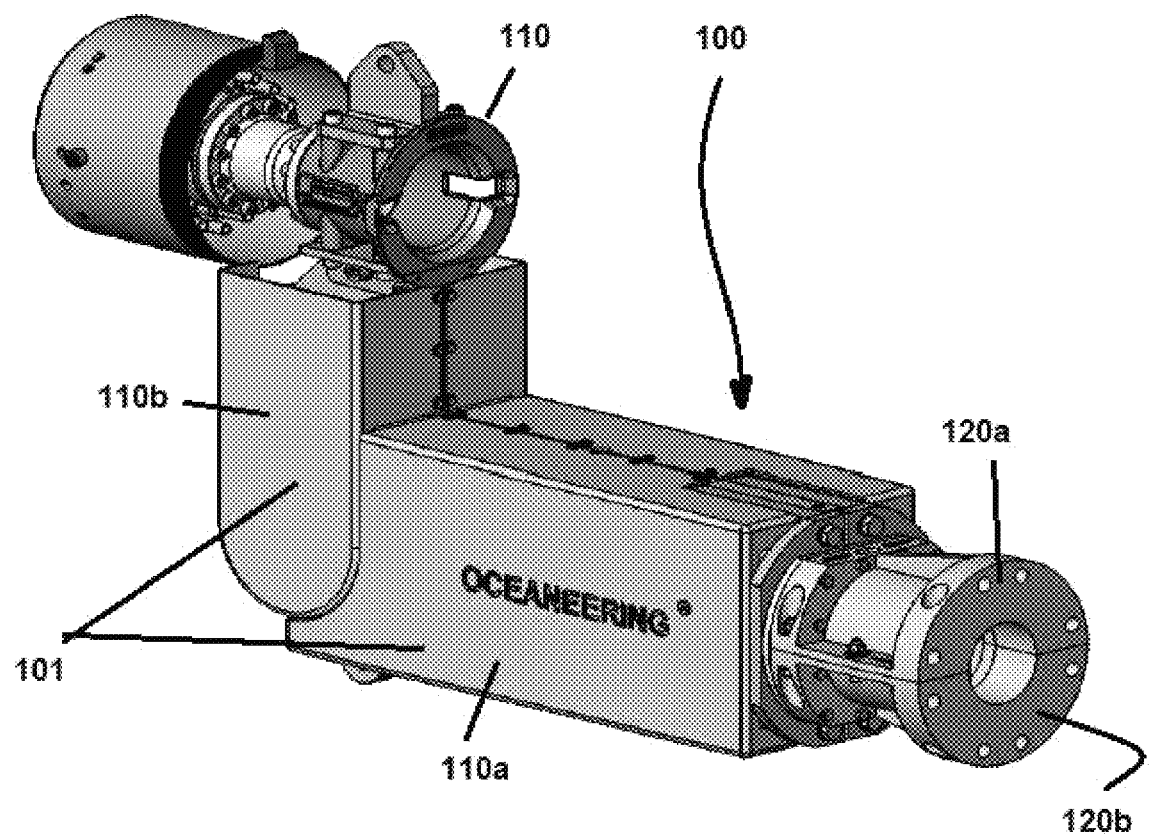
FIG. 1 is a plan view in partial perspective of a first exemplary embodiment of a versatile flying lead (VHL) termination head system.
Figure 2:
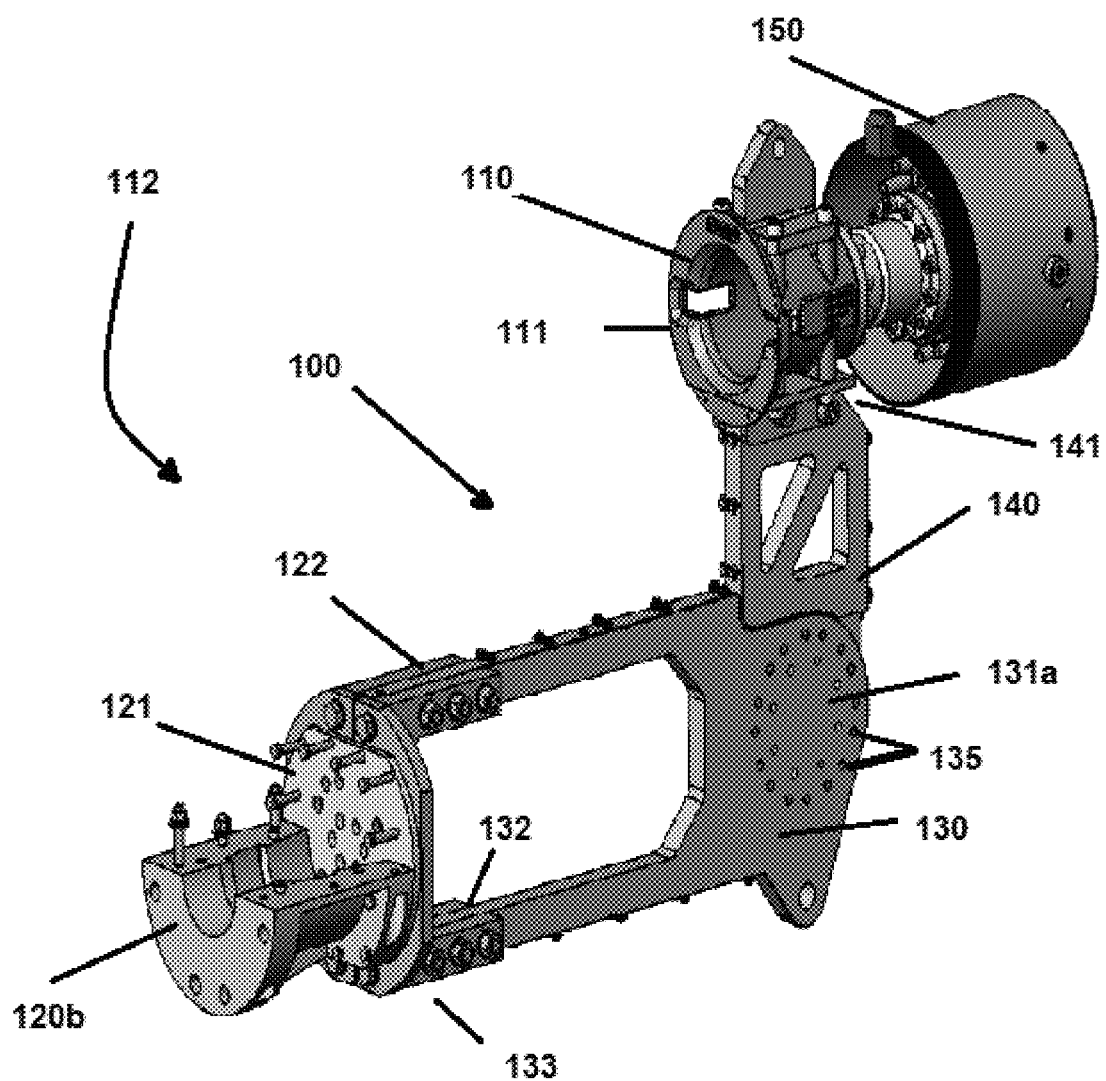
FIG. 2 is a plan view in partial perspective of the first exemplary embodiment of the versatile flying lead (VHL) termination head system.
Figure 3:
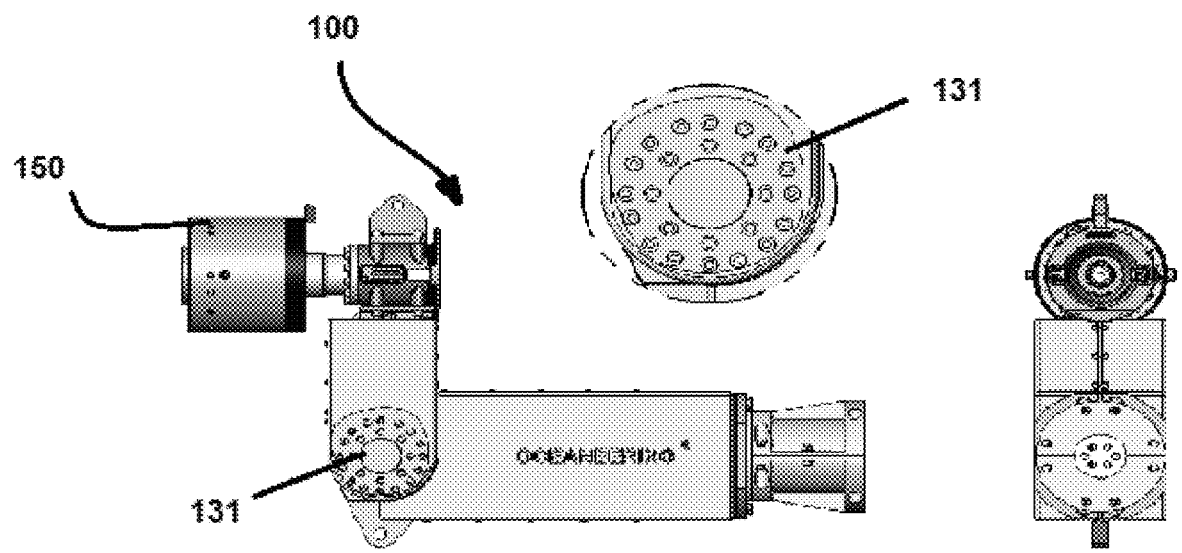
FIG. 3 are plan views in partial perspective of the first exemplary embodiment of the versatile flying lead (VHL) termination head system.
Figure 4:
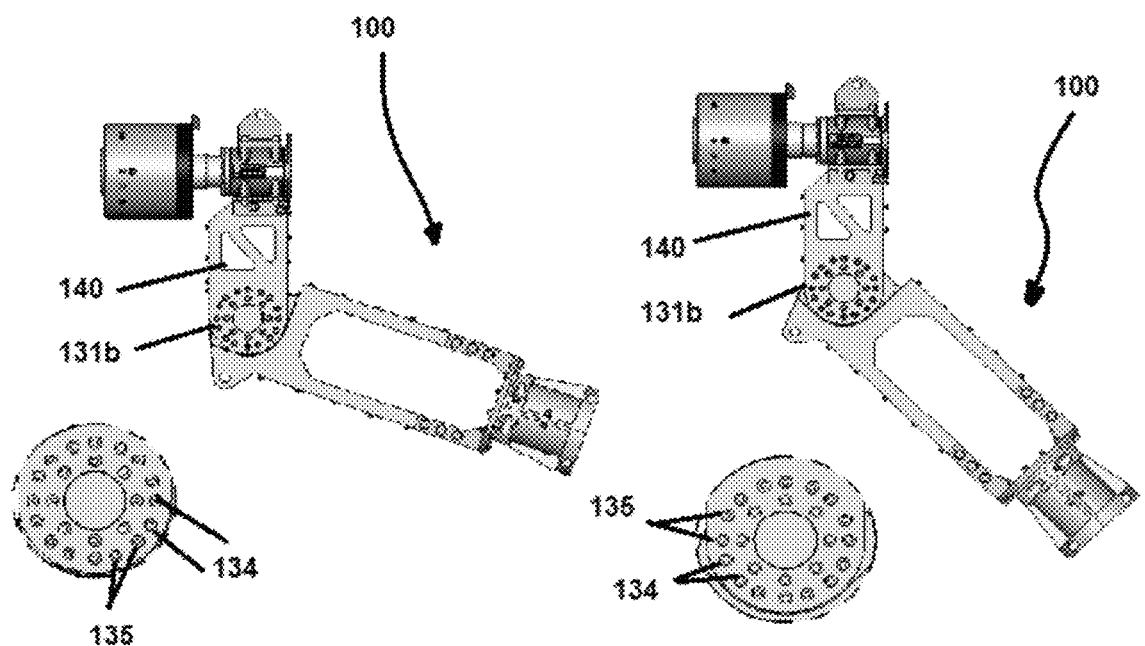
FIG. 4 are plan views in partial perspective of an the first exemplary embodiment of the versatile flying lead (VHL) termination head system illustrating various adjusted angles.
Figure 5:
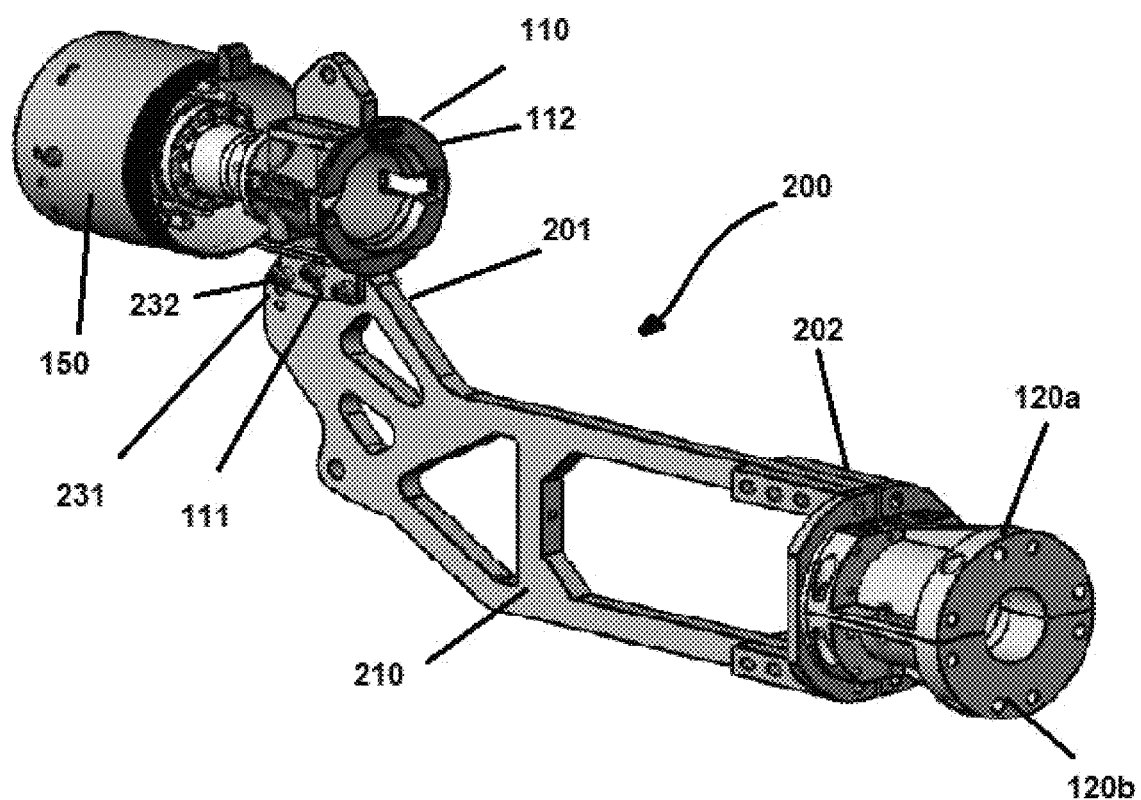
FIG. 5 is a plan view in partial perspective of a second exemplary embodiment of a versatile flying lead (VHL) termination head system.

Referring now to FIGS. 1-2 and 5, versatile flying lead (VHL) termination head system 100 comprises underwater vehicle interface 110 which can provide an interface to an underwater vehicle such as a remotely operated vehicle or an autonomously operated vehicle; interface plate 120 (shown in an embodiment having two halves, 120a and 120b); and a termination frame (130 and 140 in FIG. 2 or 210 in FIG. 5).

Interface plate 120 may further comprise upper interface plate 120a removably connected to lower interface plate 120b.

In embodiments the termination frames comprises a connection end (141 (FIG. 2) or 201 (FIG. 5)) connected to underwater vehicle interface 110; interface end (132 (FIG. 2) or 202 (FIG. 5)), the interface plate (120) connected to the interface end (202); and adjuster (131 (FIG. 2) or 231 (FIG. 5)) disposed proximate the connection end where the adjuster is configured to provide a configurable declination angle which sets a hang-off angle of a device connected to interface plate 120 with respect to underwater vehicle interface 110.

The configurable declination angle typically comprises a set of predetermined, distinct, configurable declination angles.

The device may comprise a typical underwater component such as subsea umbilical (10) or a cable.

In embodiments, the adjuster (131 (FIG. 2) or 231 (FIG. 5)) may comprise a fastener, a threaded rod, a gear and pinion, and/or a drive screw. If a fastener is present, the fastener may comprise a bolt (similar to pins 132) and underwater vehicle interface 110 may further comprise bracket 111 which comprises one or more bolt receivers.

Underwater vehicle interface 110 typically comprises remotely operated vehicle bucket (150).

In certain embodiments, a conduit (not shown the figures) may be present and connected to interface plate 120 and/or underwater vehicle interface 110.

In embodiments, underwater vehicle interface 110 comprises removable plate 112 and may further comprise remotely operated vehicle bucket 150.

Referring now to FIGS. 1-4, in an embodiment the termination frame comprises lower termination frame plate 130 which comprises interface end 132 and upper termination frame plate 140 operatively connected to lower termination frame plate 130, where upper termination frame plate 140 comprises connection end 141. In this embodiment, lower termination plate 130 typically comprises first adjuster portion 131a and upper termination plate 140 comprises second adjuster portion 131b. First adjuster portion 131a may comprise latch 132 or latch receiver 133. Second adjuster portion 131b comprises either latch receiver 133 configured to removably receive latch 132 if first adjuster portion comprises latch 132 or latch 132 configured to be removably received into latch receiver 133 if first adjuster portion 131 comprises latch receiver 133. In either of these configurations, latch 132 may comprise a set of pins 134 and latch receiver 133 may comprise a set of pin receivers 135, that correspond to a predetermined subset of the set of pins 134. Note that not all pins 134 or pin receivers 135 have callouts in the figures.

In these embodiments, interface plate 120 is typically connected to lower termination plate 130 at an end of lower termination plate 130 opposite from an end of lower termination plate 130 where underwater vehicle interface 110 is disposed. Further, interface plate 121 may be present and disposed intermediate interface plate 120 and lower termination frame plate 130 where interface plate 121 is connected to interface plate 120 and lower termination frame plate 130. Interface plate 121 may further comprise interface plate mounting support 122 configured to connect interface plate 121 to lower termination frame plate 130.

In these embodiments, a set of lower frame covers 110a may be present and connected to lower termination frame plate 130. Further, a set of upper frame covers 110b may be present and connected to upper termination frame plate 140 where the set of upper frame covers 110b is configured to slidably interface with the set of lower frame covers 110a.

Figure 6:
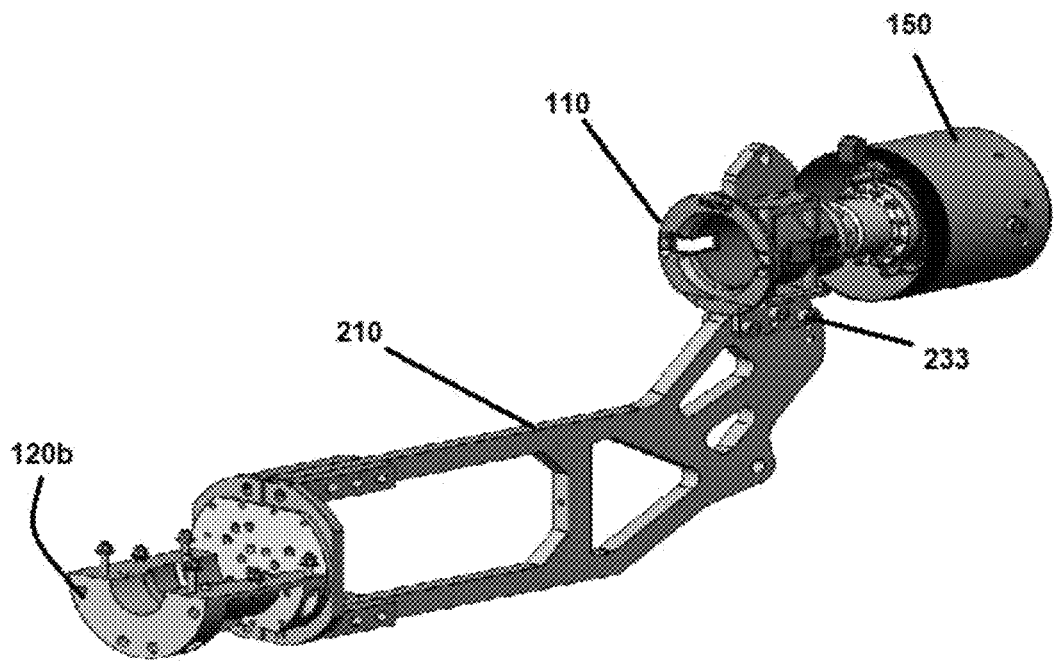
FIG. 6 is a plan view in partial perspective of the second exemplary embodiment of a versatile flying lead (VHL) termination head system.
Figure 7:
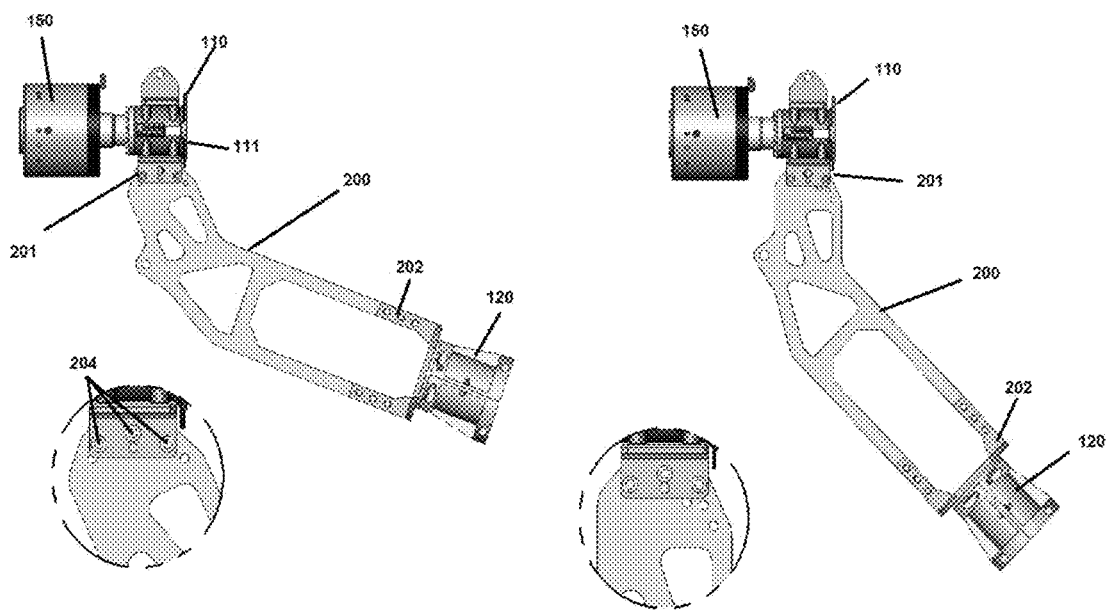
FIG. 7 is a plan view in partial perspective of the second exemplary embodiment of a versatile flying lead (VHL) termination head system illustrating various adjusted angles.

Referring now to FIGS. 5-7, in other contemplated embodiments the termination frame comprises termination frame plate 210, connection end 201 connected to underwater vehicle interface 110; and interface end 202 connected to interface plate 120.

Further, connection end 201 may comprise a predetermined set of connector receivers 204 and underwater vehicle interface 110 may comprise bracket 111 which comprises a predetermined set of bracket receivers adapted to align with a predetermined subset of the predetermined set of connector receivers 204. Adjuster 231 typically comprises a predetermined set of fasteners 232 adapted to be received through the predetermined set of bracket receivers and their aligned predetermined subset of the predetermined set of connector receivers.

In these embodiments, fasteners typically comprise bolt 232 and nut 233 adapted to thread onto bolt 232.

In the operation of exemplary embodiments, a versatile flying lead (VHL) subsea termination head system 100 may be manufactured and assembled by obtaining a predetermined set of standardized structural building blocks that fit together to form a complete termination frame, where the termination frame is as described above in its various embodiments. The predetermined set of standardized structural building blocks may be used to construct the versatile flying lead (VHL) subsea termination head system 100 from the predetermined set of standardized structural building blocks substantially in parallel.

Underwater vehicle interface 110 may be connected to the termination frame at a predetermined angle using the adjuster (131 (FIG. 2) or 231 (FIG. 5)). Typically, the termination frame may be constructed and tested where the constructing and testing coincide separately and the termination frame and its internals fitted together to form the completed versatile flying lead (VHL) subsea termination head system 100. These internals may comprise a tubing, a coupler, or a connector, or the like, or a combination thereof. Standardized components may be used such that individual sets of components are manufactured and tested at different facilities and then combined together to form completed versatile flying lead (VHL) subsea termination head system 100.

Figure 8:
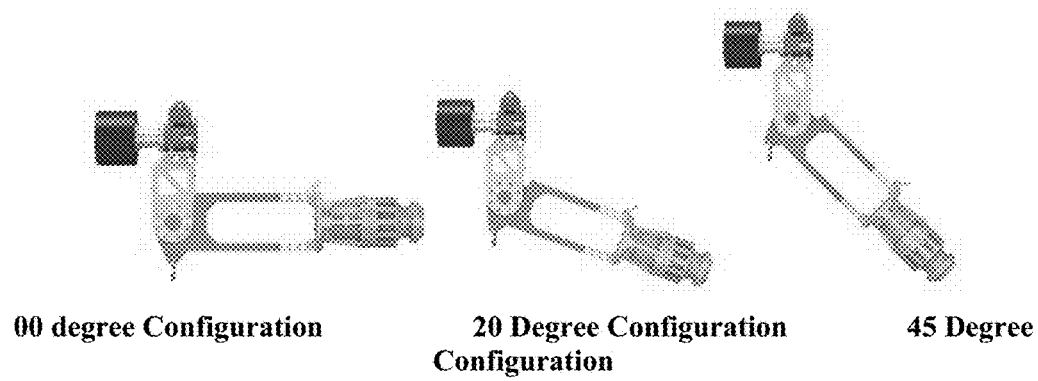
FIG. 8 is a further plan view in partial perspective of the first exemplary embodiment of a versatile flying lead (VHL) termination head system illustrating various adjusted angles.

FIGS. 7-8 illustrate how versatile flying lead (VHL) subsea termination head system 100 may be configured in its declination angle. As illustrated, one of ordinary skill in these arts can see how the declination angle of the termination frame sets the hang-off angle of an attached subsea umbilical or cable.

Figure 9:
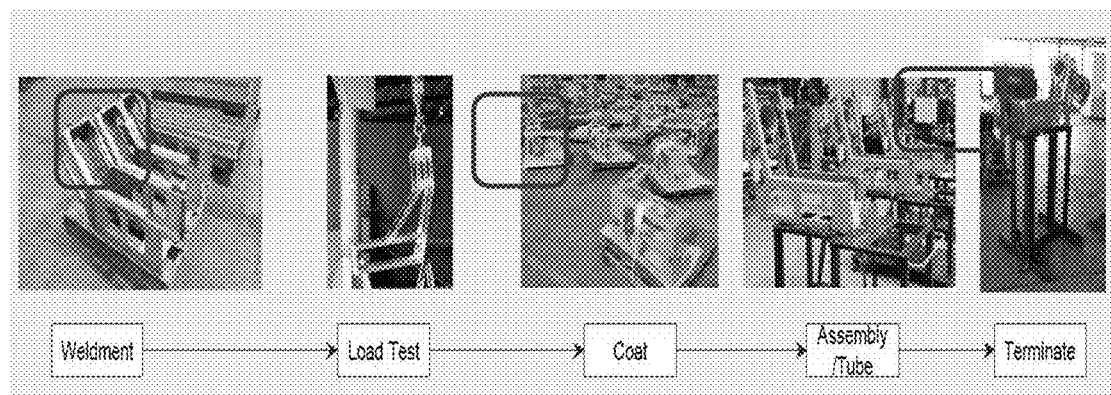
FIG. 9 is a block diagrammatic view of a linear manufacturing process.
Figure 10:
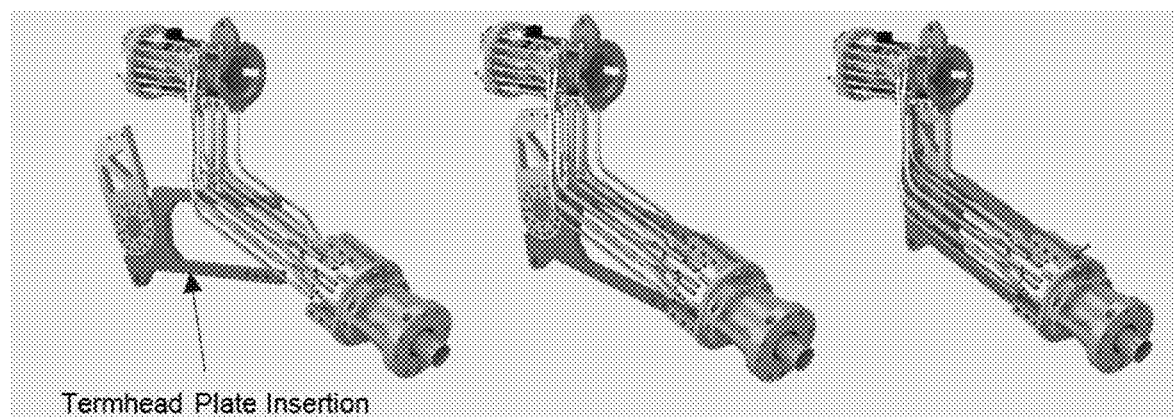
FIG. 10 is a set of plan views in partial perspective illustrating a manufacturing process of the first exemplary embodiment of a versatile flying lead (VHL) termination head system using standard building blocks.

As further illustrated in FIGS. 9-10, the manufacturing process described above provides for the construction and assembly of versatile flying lead (VHL) subsea termination head system 100 utilizing standardized structural building blocks that fit together to form the complete termination frame, resulting in a flexibility which allows for parallel and remote manufacturing processes. As illustrated in FIG. 9, manufacturing of subsea termination frames currently occurs along a rigid linear path. Parallel manufacturing allows the construction/testing of the structural termination frame and its internals (tubings, couplers, connectors such as illustrated in FIG. 10) to coincide separately, and then fitted together to form the completed termination head assembly. Remote manufacturing is where the building blocks are standardized so that individual blocks can be manufactured/tested at different facilities and then combined together to form the complete structural termination frame.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A versatile flying lead (VHL) termination head system, comprising:
   a. an underwater vehicle interface;
   b. an interface plate, comprising:
      i. an upper interface plate; and
      ii. a lower interface plate removably connected to the upper interface plate;
   c. a termination frame, comprising:
      i. a connection end connected to the underwater vehicle interface;
      ii. an interface end, the interface plate connected to the interface end; and
   d. an adjuster disposed proximate the connection end, the adjuster configured to provide a configurable declination angle which sets a hang-off angle of a device connected to the interface plate with respect to the underwater vehicle interface.

2. The versatile flying lead (VHL) termination head system of claim 1, wherein the device comprises a subsea umbilical or a cable.

3. The versatile flying lead (VHL) termination head system of claim 1, wherein the adjuster comprises a fastener, a threaded rod, a gear and pinion, and/or a drive screw.

4. The versatile flying lead (VHL) termination head system of claim 3, wherein:
   a. the fastener comprises a bolt; and
   b. the underwater vehicle interface further comprises a bracket, the bracket comprising a bolt receiver.

5. The versatile flying lead (VHL) termination head system of claim 1, wherein the configurable declination angle comprises a set of predetermined distinct configurable declination angles.

6. The versatile flying lead (VFL) termination head system of claim 1, wherein the underwater vehicle interface comprises an interface to a remotely operated vehicle or an autonomously operated vehicle.

7. The versatile flying lead (VHL) termination head system of claim 1, wherein the frame comprises:

a. a lower termination frame plate, the lower termination frame plate comprising the interface end; and
b. an upper termination frame plate operatively connected to the lower termination frame plate, the upper termination frame plate comprising the connection end.

8. The versatile flying lead (VFL) termination head system of claim 7, wherein
   a. the lower termination plate comprises a first adjuster portion;
   b. the upper termination plate comprises a second adjuster portion;
   c. the first adjuster portion comprises a latch or a latch receiver; and
   d. the second adjuster portion either comprises:
      i. the latch receiver configured to removably receive the latch if the first adjuster portion comprises the latch; or
      ii. the latch configured to be removably received into the latch receiver if the first adjuster portion comprises a latch receiver.

9. The versatile flying lead (VFL) termination head system of claim 7, wherein the interface plate is connected to the lower termination plate at an end of the lower termination plate opposite from an end of the lower termination plate where the underwater vehicle interface is disposed.

10. The versatile flying lead (VFL) termination head system of claim 7, further comprising:
    a. a set of lower frame covers connected to the lower termination frame plate; and
    b. a set of upper frame covers connected to the upper termination frame plate, the set of upper frame covers configured to slidably interface with set of lower frame covers.

11. The versatile flying lead (VHL) termination head system of claim 1, wherein the frame comprises:
    a. a termination frame plate;
    b. a connection end connected to the underwater vehicle interface;
    c. an interface end, the interface plate connected to the interface end.

12. The versatile flying lead (VHL) termination head system of claim 1, wherein:
    a. the connection end comprises a predetermined set of connector receivers;
    b. the underwater vehicle interface comprises a bracket, the bracket comprising a predetermined set of bracket receivers adapted to align with a predetermined subset of the predetermined set of connector receivers; and
    c. the adjuster comprises a predetermined set of fasteners adapted to be received through the predetermined set of bracket receivers and their aligned predetermined subset of the predetermined set of connector receivers.

13. The versatile flying lead (VHL) termination head system of claim 12, wherein the fasteners comprise a bolt and a nut adapted to thread onto the bolt.

\* \* \* \* \*